May 1, 1962 W. A. BISHMAN 3,032,094
TIRE CHANGER MACHINE IMPROVEMENTS
Filed Jan. 7, 1959 8 Sheets-Sheet 1

INVENTOR.
WALTER A. BISHMAN
BY Dugger & Johnson
ATTORNEYS

May 1, 1962 W. A. BISHMAN 3,032,094
TIRE CHANGER MACHINE IMPROVEMENTS
Filed Jan. 7, 1959 8 Sheets-Sheet 2
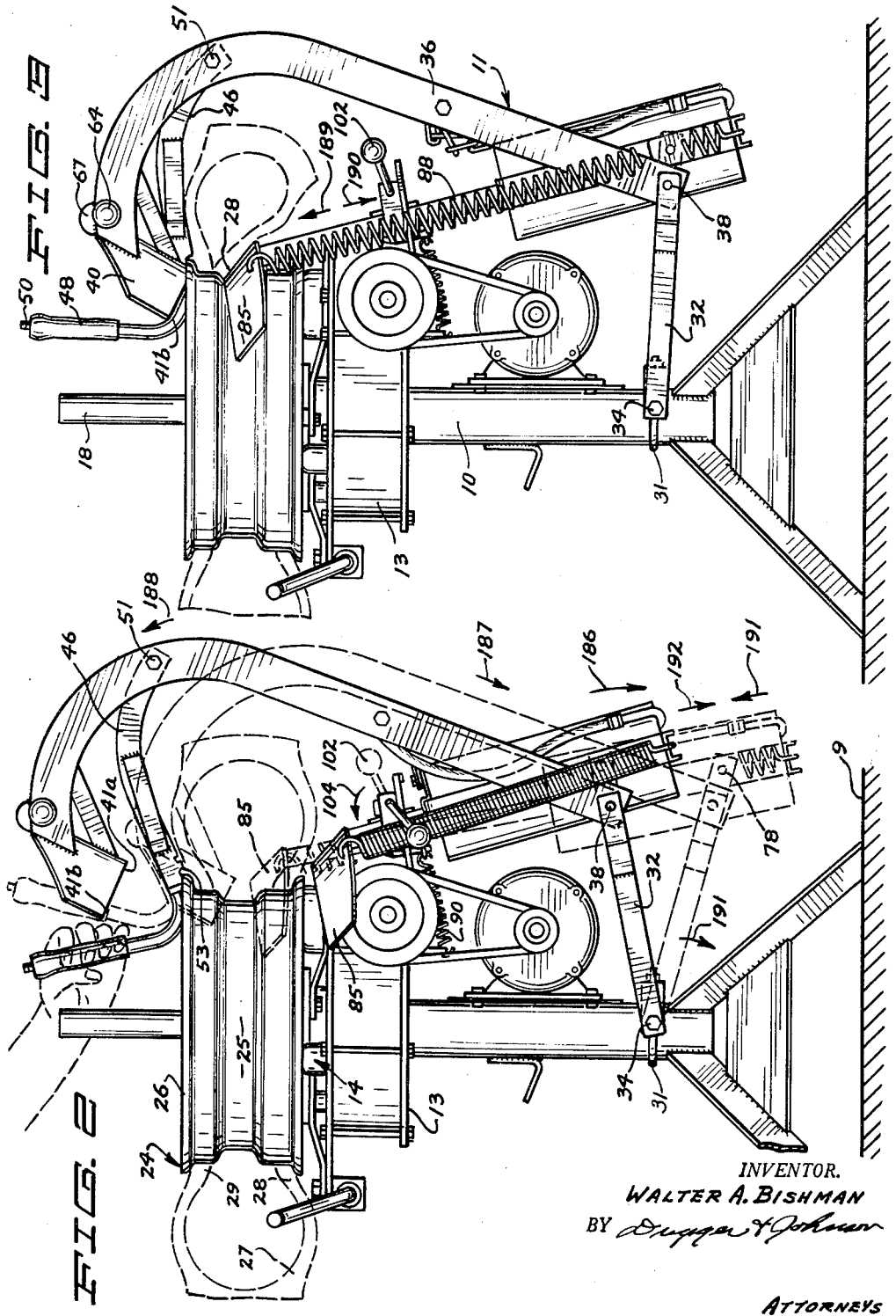
INVENTOR.
WALTER A. BISHMAN
BY
ATTORNEYS

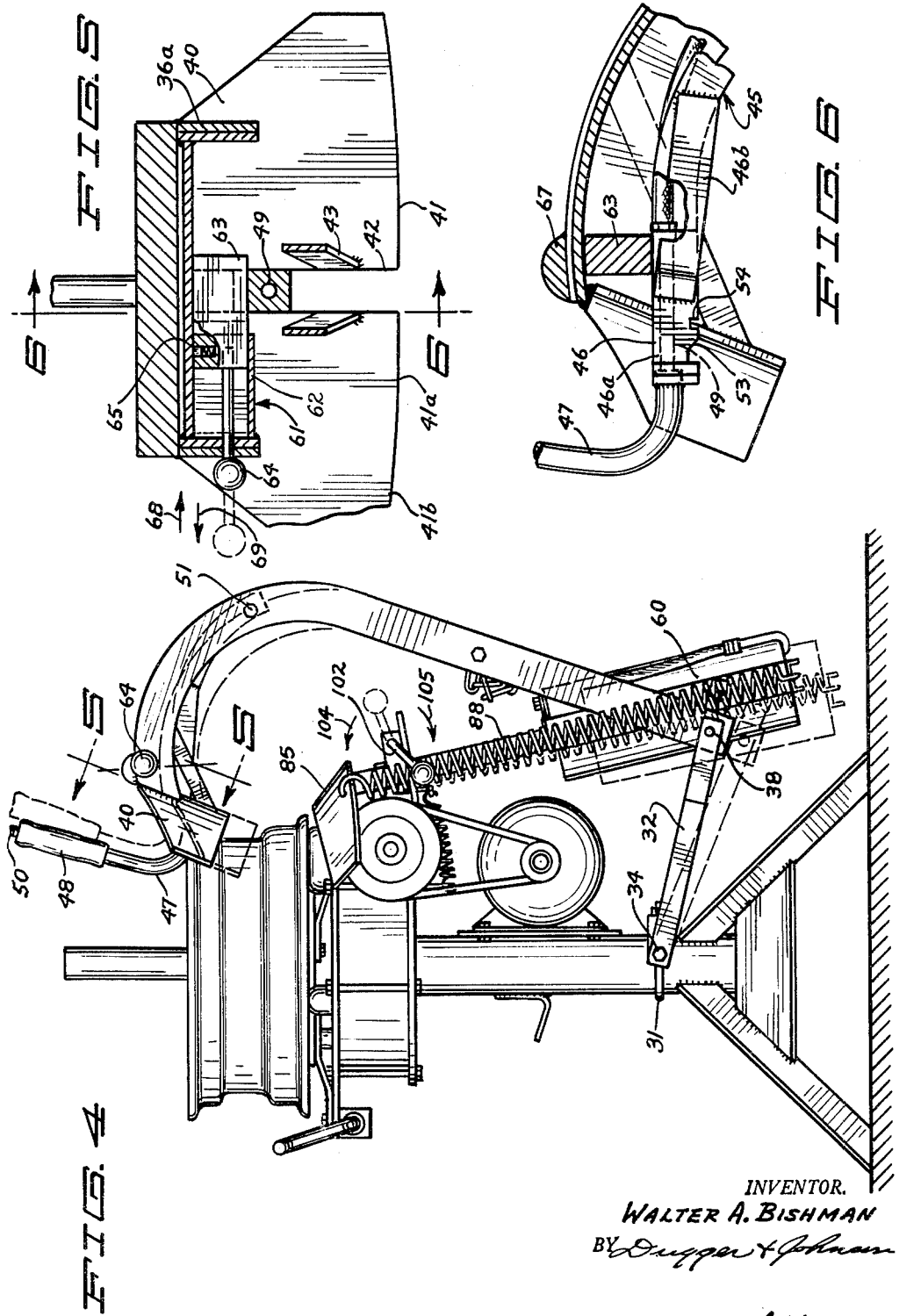

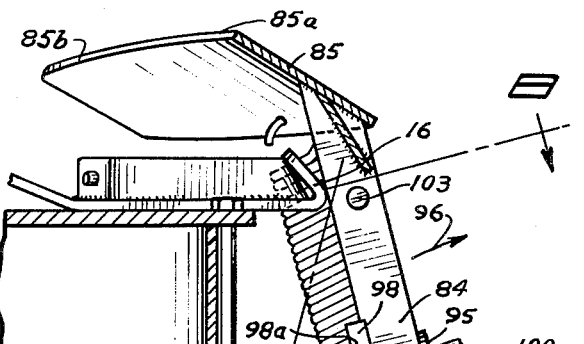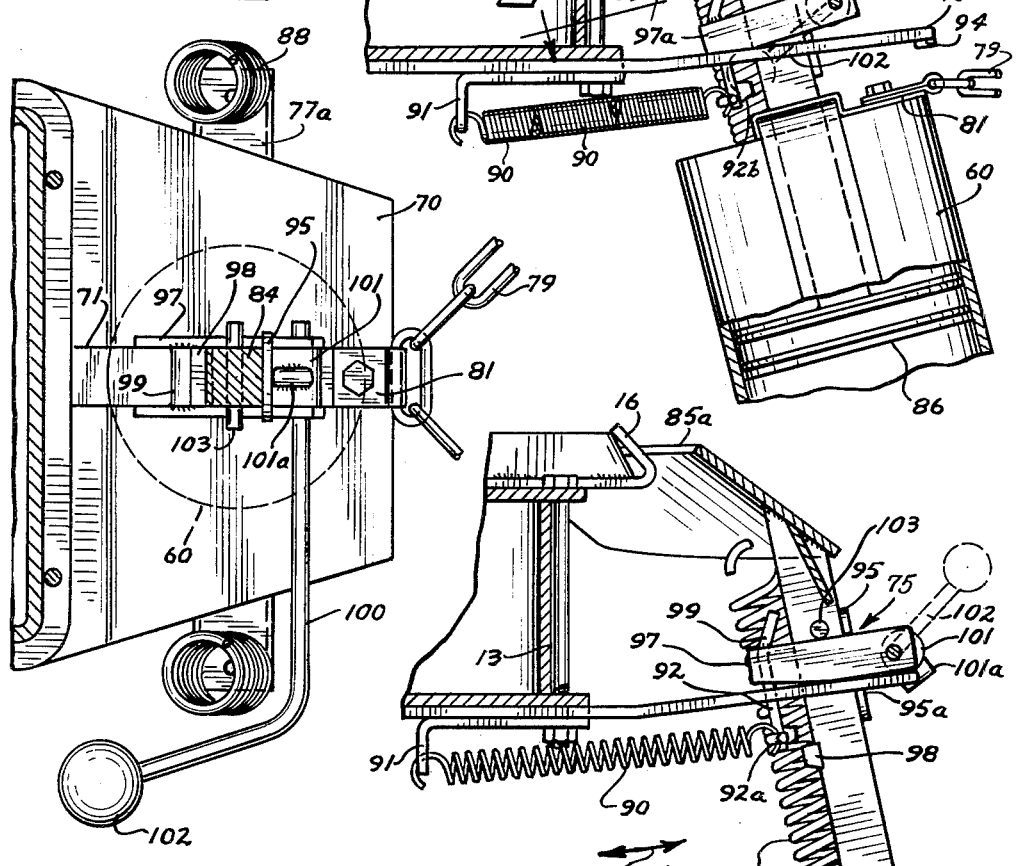

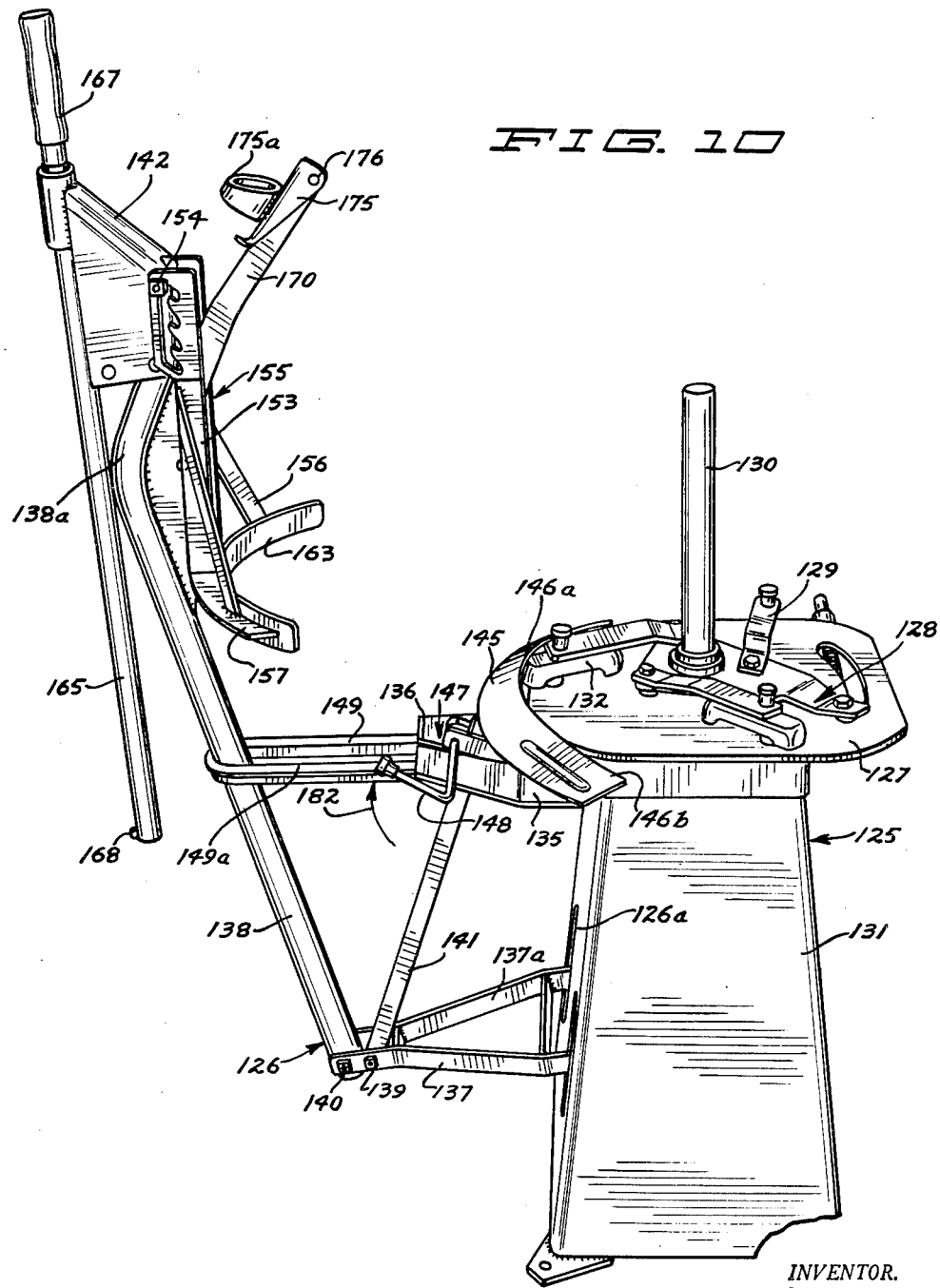

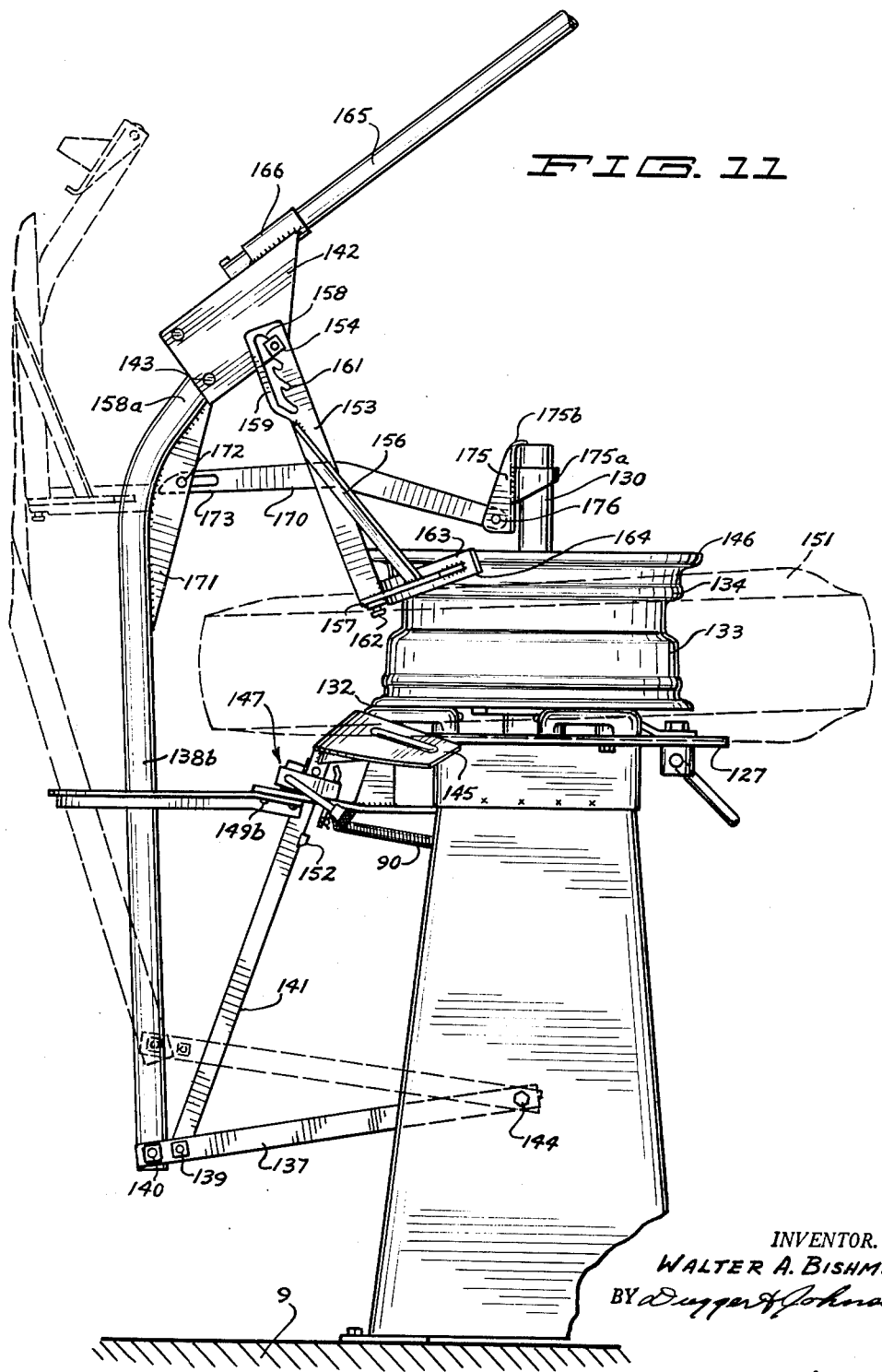

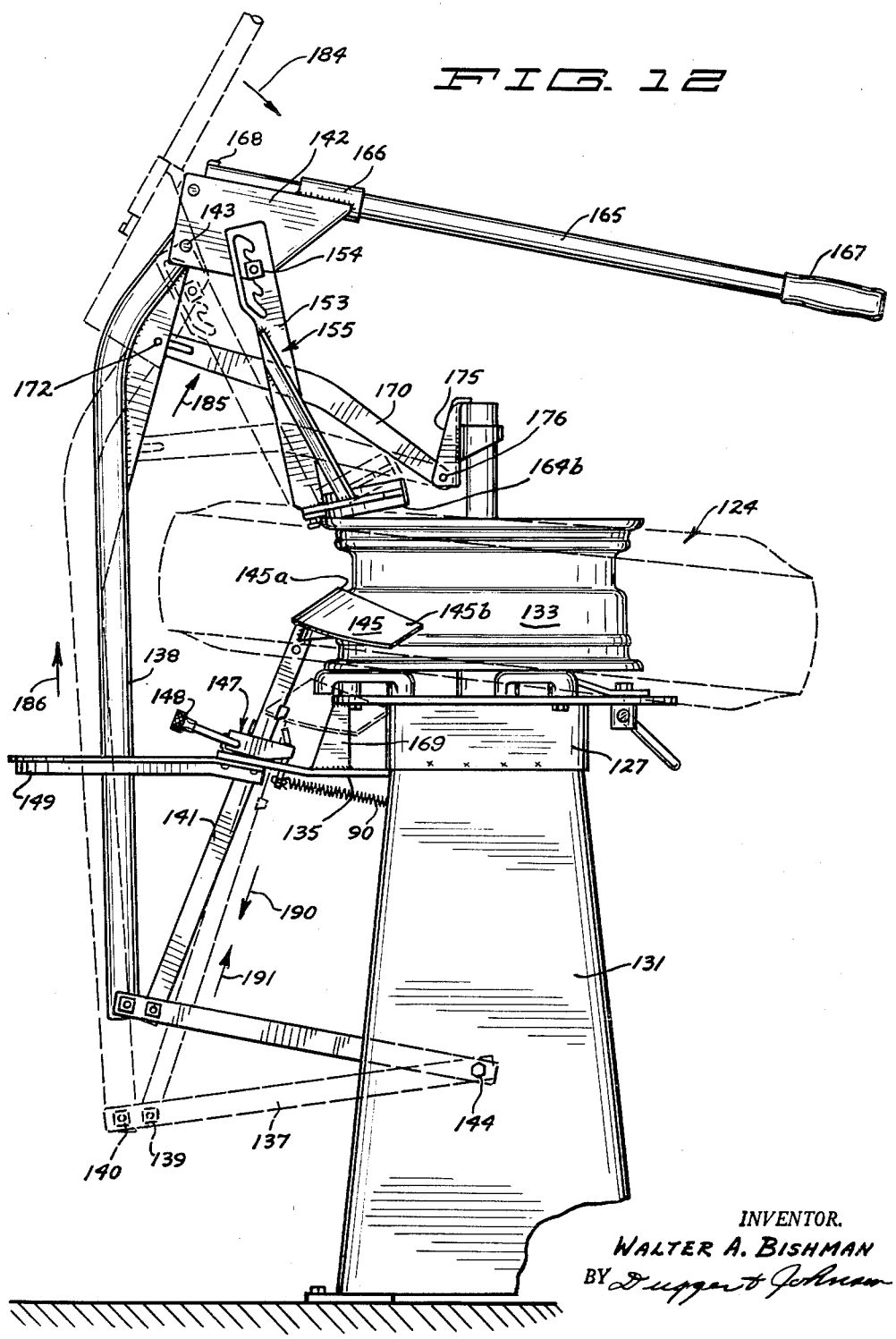

May 1, 1962 W. A. BISHMAN 3,032,094
TIRE CHANGER MACHINE IMPROVEMENTS
Filed Jan. 7, 1959 8 Sheets-Sheet 8

INVENTOR.
WALTER A. BISHMAN
BY Dugger & Johnson
ATTORNEYS

United States Patent Office 3,032,094
Patented May 1, 1962

3,032,094
TIRE CHANGER MACHINE IMPROVEMENTS
Walter A. Bishman, Minneapolis, Minn., assignor to Bishman Manufacturing Company, Osseo, Minn., a corporation of Minnesota
Filed Jan. 7, 1959, Ser. No. 785,410
16 Claims. (Cl. 157—1.28)

This invention relates to new and novel improvements in apparatus for breaking the beads of a tire away from the rim flanges of a rim. More particularly, this invention relates to an improved tire changer machine that may be used to break either the top or the bottom bead of a tire from a rim flange without having to remove the tire from said apparatus once it has been mounted thereon.

An object of this invention is to provide a new and improved tire changer machine that may be used to selectively break either the top or the bottom bead from the respective rim flange without having to remove the rim from the machine. A further object of this invention is to provide an improved tire changer machine for breaking either the bottom or the top bead of a tire from a rim flange that provides better leverage and control of the location of the pivot points of the operative linkage arms of the machine during the bead breaking operation than apparatus of the prior art.

It is still a further object of this invention to provide a new and improved tire changer machine that uses a pneumatic power source to furnish the operative power for breaking either the top bead or the bottom bead from the rim flange without having to remove the wheel from the machine once it has been mounted thereon. An additional object of this invention is to provide a new and improved tire changer machine that uses a single pneumatic power source for alternately breaking the top bead or the bottom bead from the rim flanges without having to demount the rim from said machine.

A still additional object of this invention is to provide a new and improved tire changer machine that may be used to alternately break the top bead or the bottom bead from the respective rim flanges of the rim without removing the rim from said apparatus once it has been mounted thereon, the operative power for breaking the beads being manual. It is still an additional object of this invention to provide a new and improved tire changer machine that may be used for alternately breaking the top bead and the bottom bed of a tire from the respective rim flanges without demounting the rim from said apparatus and that after the bottom bead has been broken will hold the bottom bead in a raised position above the rim flange while other operations in demounting the tire are being performed. It is still an additional object of this invention to provide a new and improved tire changer machine having lock mechanism for selectively retaining the lower bead breaker tool in an initial position and in a raised position. It is another object of this invention to provide a new and improved tire changer machine having control mechanism to hold the top bead breaker tool at a desired location while the opposite bead is being broken.

It is still a further object of this invention to provide a new and improved tire changer machine that may be used to alternately break the top and the bottom bead from their respective rim flanges without demounting the tire, and that has a detachable linkage connection to the central shaft to facilitate mounting and demounting the tire on the machine and to provide a positive control of the movement of the pivots which are operative during the bead breaking operation. A further object of this invention is to provide an improved tire changer machine that may be used for breaking the top bead from the rim flange and that has a control for selectively varying the maximum length of stroke of the top bead breaker tool.

Still another object of this invention is to provide a new and improved tire changer machine that may be used for breaking the top bead and the bottom bead from the rim flanges of a rim of wheels of varying sizes and models including those having safety humps.

Other and further objects are those inherent in the invention herein illustrated, described in the claims, and will be apparent as the description proceeds.

To the accomplishment of the foregoing and related ends, this invention then comprises features hereinafter fully described and particularly pointed out in the claims, the following description setting forth in detail certain illustrative embodiments of this invention, these being indicative, however, of but a few of the various ways in which the principles of the invention may eb employed.

The invention is illustrated by reference to the drawings in which the corresponding numerals refer to same parts and in which:

FIGURE 2 is a side view of the tire changer machine of FIGURE 1 illustrating the operation of said machine breaking both the top bead and the bottom bead from the rim flange, the initial setting of the elements of the machine for breaking the beads being illustrated in full line and the bead broken position of said elements being illustrated in dotted lines;

FIGURE 3 is a side view of the tire changer machine of FIGURE 1 illustrating the use of said machine for breaking only the bottom bead from the rim flange;

Figure 1:
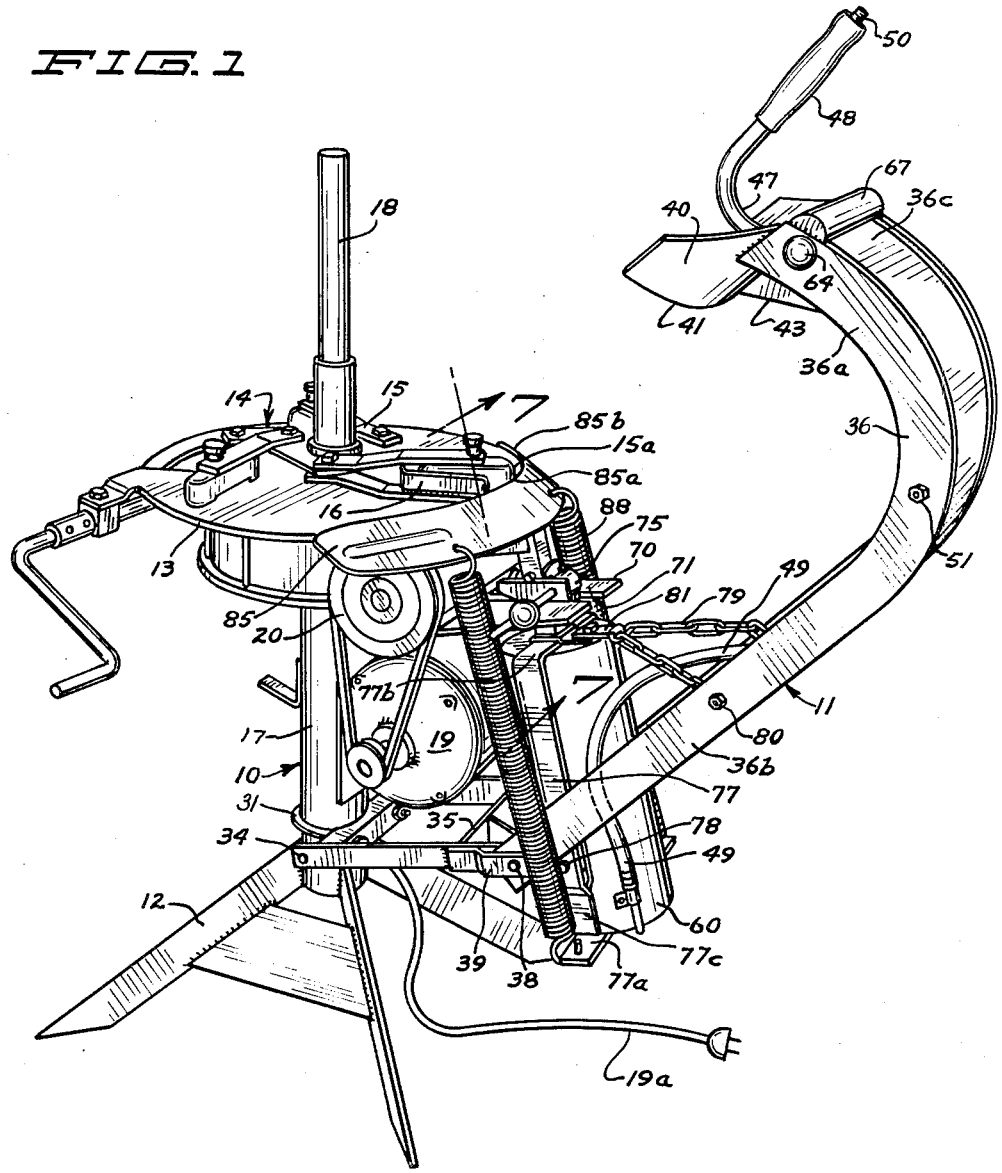
FIGURE 1 is a perspective view of the first embodiment of the tire changer of this invention.

FIGURE 4 is a side view of the tire changer machine of FIGURE 1 illustrating the operation of said machine for breaking only the top bead from the rim flange when a relatively long stroke of the bead breaker tool is required, the full line position illustrating the position of said tool at the end of the normal length stroke and the dotted line position illustrating the position of said tool at the end of the long stroke of said tool;

FIGURE 5 is an enlarged fragmentary sectional view of the top bead breaker tool stroke control of the machine of FIGURE 1, said control in the full line position being set for a normal length stroke and in dotted lines for a long stroke, said view being taken along the line and looking in the direction of the arrows 5—5 of FIGURE 6;

FIGURE 6 is an enlarged fragmentary side sectional view of the top bead plate stroke control, said view being taken along the line and looking in the direction of the arrows 6—6 of FIGURE 5;

FIGURE 7 is an enlarged fragmentary side sectional view of lock-control mechanism and the mounting thereof on the tire changer machine of FIGURE 1, the control being illustrated in a raised locked position, said view being taken along the line and looking in the direction of the arrow 7—7 of FIGURE 1;

FIGURE 8 is an enlarged fragmentary top view of the lock-control mechanism illustrated in FIGURE 7, said view being taken along the line and looking in the direction of the arrows 8—8 of FIGURE 7;

FIGURE 9 is an enlarged fragmentary side sectional view similar to that illustrated in FIGURE 7, said view illustrating the lock-control mechanism in an unlocked position and the bottom bead breaker tool in an initial position wherein the wheel chuck is adjusted for a large wheel;

FIGURE 10 is a perspective view of the second embodiment of the tire changer machine of this invention;

FIGURE 11 is a side view of the tire changer machine illustrated in FIGURE 10, said view illustrating the operation of said machine for breaking only the top bead;

FIGURE 12 is a side view of the tire changer machine of FIGURE 10, said view illustrating the operation of the machine for breaking only the bottom bead, the dotted line position illustrating the initial setting of the machine for breaking the top bead and the full line positions illustrating the elements of the machine in a bead broken position.

Figure 14:
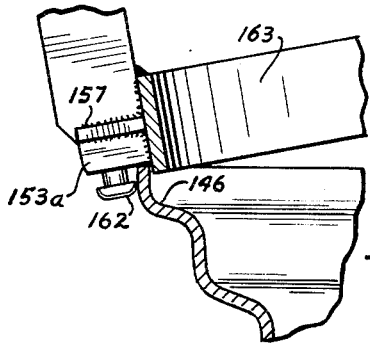
Figure 15:
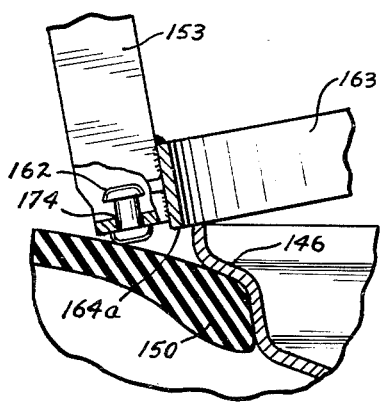
Figure 13:
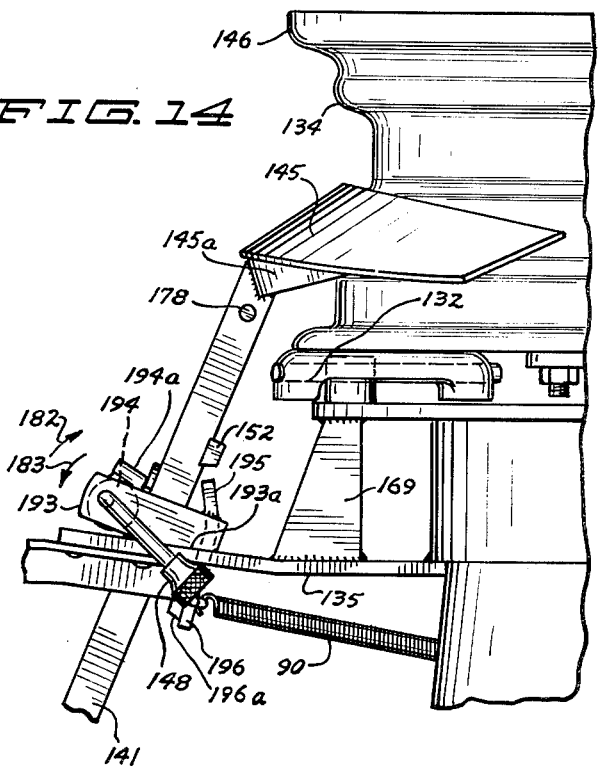
Figure 16:
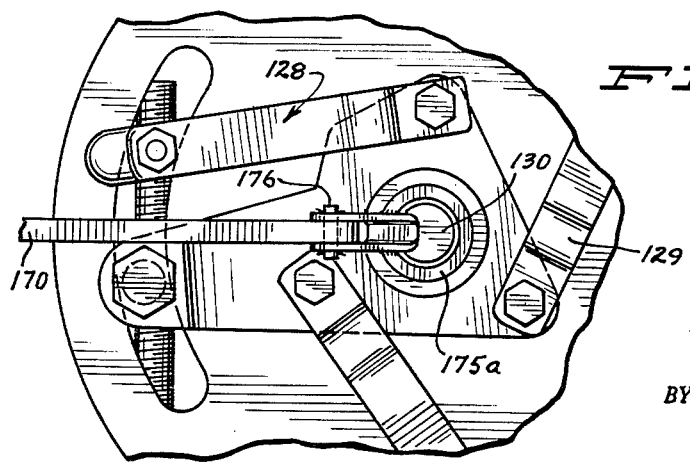

FIGURE 13 is an enlarged fragmentary side view of the lock-control mechanism of this invention, said mechanism retaining the lower bead breaker tool of the machine illustrated in FIGURE 10 in a raised position;

FIGURE 14 is an enlarged fragmentary side sectional view of the means for retaining the top bead breaker tool of the machine of FIGURE 10 in position on top of the rim flange;

FIGURE 15 is an enlarged fragmentary view similar to that illustrated in FIGURE 14 except that the bead breaker tool is set in a top bead breaking position;

FIGURE 16 is an enlarged top sectional view of the tie bar retainer in a clamped position on the center shaft.

Referring now to FIGURE 1 there is illustrated a perspective view of the first embodiment of the new and improved tire changer machine of this invention, said machine being generally designated 10. The tire changer machine includes a stand 12, an upright post 17 mounted on said stand, a generally horizontal wheel mounting base 13 secured to the upper end of said post, a wheel chuck 14 mounted on said base, said wheel chuck being suitable for mounting tires of various sizes, an upright center shaft 18 extending upwardly from the central portion of the base, and the bead breaker assembly generally designated 11. There also may be provided a motor 19 and drive mechanism 20 for rotating the center shaft and a tire mounting tool (not shown) or a tire demounting tool (not shown) secured to said shaft relative to the rim. A more detailed description of an earlier model of the tire changer machine of this invention and the operation thereof except for bead breaker assembly may be found in United States Patent 2,695,659 and therefore the structure and the operation of the tire changer machine except for the bead breaker assembly will not be described in detail.

The bead breaker assembly 11 includes a mounting member 31 which is removably secured to the lower end of the post 17. A pair of spaced support arms 32 having end portions pivotally connected to the opposite ends of the mounting member 31 by pivot pins 34 are mounted to pivot in parallel vertical planes on opposite sides of the post 17. Cross bracing 35 is provided for connecting the respective opposite end portions of the support arms.

An offset bracket 39 may be welded to the outer end portions of each of the support arms to form a clevis for pivotally retaining the respective lower end portions of the spaced straight leg portions 36b of the elongated J-shaped lever frame 36 between said offset and the support arm, there being a pivot 38 extended through each of the respective offset brackets 39, legs 36b, and the support arms. The lever frame is I-shaped in cross section and includes a pair of spaced curved leg portions 36a and a web 36c which is secured between said curved leg portions and straight leg portions. The lever frame is mounted to have the curved leg portions extend inwardly towards the central shaft and to have a pivotal axis that is perpendicular to a vertical plane passed through the said shaft.

Secured to the outer edges of the curved portion of the lever frame is an elongated bead breaker tool 40. The aforementioned bead breaker tool is a plate that is curved longitudinally and has a radius of curvature slightly greater than the radius of curvature of the beads (on the largest tire) to be broken from the rim flanges on which they are mounted. The bead breaker tool 40 has a transverse axis that is substantially parallel to the longitudinal axis of the straight leg portion of the lever frame and has a lower bead engaging edge 41 which is convexly curved (see FIGURE 1) to have a leading edge portion 41a and a trailing edge portion 41b. The plate is cut into two sections to form the transverse rectangular slot 42 which extends the transverse height of said tool. Each section of the plate is welded to the brace 67 to be held spaced from the other section. The purpose of providing the aforementioned slot will become apparently hereinafter. A brace 43 is secured to each end of the tool 40. The opposite ends of the brace are secured to the lever frame 36.

A bead breaker control 45 which includes a control arm 46 is pivotally connected to the lever frame 36 adjacent the juncture of the curved legs and straight leg portions to pivot in the slot 42. The control arm 46 is a curved elongated generally Y-shaped member having a channel straight leg 46a, one end thereof being attached to the hollow handle 47 and a V-shaped portion 46b having the outer ends of the legs forming the V pivotally connected to the frame 36 by control arm pivot 51. The control arm effectively has a larger radius of curvature than the short or curved portion of the lever frame 36 and is of a longer length. Connected to the opposite end portion of the control arm from the pivot 51 is a handle 47, said handle extending forwardly and generally tangentially to the control arm and then being reversely bent in the direction of curvature of the control arm. A hand grip 48 is mounted on the reversely bent end portion.

An air hose 49 is mounted to extend through the channel portion of the control arm in one direction to be connected to the cylinder 60 and in the opposite direction upwardly through the hollow handle 47. A nozzle 50 is secured to the upper end portion of the air hose to extend outwardly from the handle, said nozzle comprising structure to which an air chuck may be applied.

Formed in the lower edge of the control arm adjacent the handle is a first notch 53, the length of control arm between the first notch and the control arm pivot being substantially equal to the length of support arm between pivots 34 and 38. Also located in the lower edge of the arm between the first notch and the control arm pivot is a second notch 54, said second notch being located relatively close to the first notch. The purpose of providing the aforementioned notches will be set forth hereinafter.

Mounted on the under side of the lever frame 36 adjacent the top bead breaker tool 40 is a stroke control generally designated 61. The stroke control includes a plunger housing 62 having a plunger bar 63 slideably mounted therein. An appropriate well is formed in the top portion of the plunger bar for mounting a ball and spring 65, said spring urging the ball against the web to retain the plunger bar in a slideably adjusted position.

A control rod 64 is extended through an appropriate aperture formed in the leg 36a to be secured to one end of the plunger bar. By pulling outwardly on the control rod 64 (in the direction of arrow 69, dotted line position in FIGURE 5) the plunger bar is substantially retracted into the plunger housing 62; however, pushing the control rod into an "in position" (in the direction of arrow 68, solid line position in FIGURE 5) a substantial portion of the plunger rod is pushed outwardly from the housing 62 to overlay the upper portion of the slot 42 and thus limit the upward movement of the control arm in the slot 42. Upon moving the control rod in an outward direction, the control arm may be further moved in an upward direction, from that previously mentioned, until the top surface of the control arm strikes the upper edge of the slot 42. The purpose of providing the bead breaker control 45 and the stroke control 61 will be set forth hereinafter. A brace 67 is secured to the opposite side of the lever frame from the stroke control.

Secured to the lower portion of the wheel mounting base 13 to extend radially therebeyond in a nearly horizontal direction is a rectangular support plate 70. The rectangular support plate has an elongated rectangular slot 71 cut in the central portion thereof to extend radially inwardly towards the post 10 for slideably mounting a lock-control assembly 75. The structure of the lock-control assembly will be set forth in greater detail hereinafter.

Pivotally secured to the outer end portions of the support arms 32 by pivot pins 78 is a cylinder mounting bracket assembly 77 for pivotally mounting the cylinder 60, said cylinder having a pivotal axis that is parallel to the pivot axis of frame 36. The cylinder mounting assembly includes a base portion 77a, spaced side portions 77c, and a top portion 77b which surround the cylinder. A chain 79 is attached to the lever frame 36 intermediate the pivots 38 and 51 to extend inwardly to be secured to the retainer member 81 which is in turn secured to the top portion of the cylinder mounting bracket assembly, said chain limiting the outward pivotal movement of the frame 36 (arrow 136) away from the lock-control assembly and thereby also limiting the outward pivotal movement of said frame away from the central shaft 18 as will become apparent hereinafter.

A connector rod 84 is secured to the piston 86 to extend in an upward direction adjacent the top of the mounting base when the piston is in a retracted position in the cylinder 60. Mounted on the upper end of the connector rod is a bottom bead breaker tool 85. The bead breaking tool 85 is an elongated longitudinally curved plate having an inner radius of curvature larger than the radius of curvature of the mounting base and subtending an arc that is generally one quarter of the circumferential length of a tire. The aforementioned curved plate is attached at its central portion to the connector rod to be transversely inclined in an upward and inward direction, the upper tire engaging edge of the curved plate being convexly curved to have a leading edge 85a and a trailing edge 85b on either side of the leading edge.

The wheel chuck 14 includes a shoe adjusting lever 16 that extends outwardly therefrom to have a distal end thereof bearing against the connector rod or the bottom tool 85. When the wheel chuck is adjusted (by conventional means) for retaining a tire thereon, the distal end forces the bottom tool outwardly from the shaft 18 and thereby positions the leading edge of the bottom bead breaker tool just beneath and spaced outwardly from the bottom rim flange 28 when a wheel 24 is secured in position on the mounting base. It is to be understood that if a shoe adjusting lever is not provided, the distal end of the radial arm 15 may be constructed of sufficient length to perform the functions of the shoe adjusting lever.

The connector rod 84 or the tool 85 is held in abutting engagement with the adjusting lever by a pair of spaced coiled springs 90, each being secured at one end to an angle bracket 91 that is welded to the lower portion of the mounting base 13 and at the other end to a retainer member 92 which forms a part of the lock-control assembly 75. The lock control assembly includes a plurality of members joined to form a frame to surround the connector rod, said frame permitting the connector rod to be moved therein in either an upward or downward direction. The frame is mounted for slideable movement along the longitudinal length of the slot 71 to permit the connector rod to be moved in said slot (in the direction of the double arrow 106).

The aforementioned lock control assembly frame includes a pair of spaced vertical plates 97 secured in spaced relationship at one end by a stop bar 99 and at the opposite end by the eccentric cam 101 which is mounted between said plates on the shaft 100 of the control lever 102, the shaft 100 of said control lever being rotatably secured in appropriate apertures formed in said plates. A retainer member 92 is secured to the plates 97 adjacent to and beneath the stop bars 99, said retainer member having a pair of outwardly extending hanger portions 92a which project outwardly beyond the longitudinal edges of the slot 71 for mounting the ends of springs 90. Slideably secured on the plates 97 intermediate the connector rod and the cam is a lock pad 95 having notches 95a through which plates 97 and the support plate extend.

A stop pin 103 is mounted in the upper end of the connector rod to extend outwardly beyond the sides thereof to overhang the plates 97. The stop pin is located so that when the piston is fully retracted, it will rest on plates 97, and edge 85a of the tool 85 will be spaced beneath the bead of a tire mounted on a mounting base. Also mounted on the connecting rod is a lug 98, said lug being mounted in a groove formed on the inner side of the connector rod. The lug is of a length less than the distance between the vertical plates so that it may pass therebetween and has a lower inwardly inclined side 98a that permits the lug to slide off of the stop 99 when the control lever is in the rear (unlocked) position (FIGURE 9); however, when the control lever is rotated to the forward position to have the cam surface abut against the lock pad, the lug extends outwardly beyond the connector rod a sufficient distance to prevent said lug from moving past the stop 99 and thus limits the movement of the connector rod.

The cam 101 has a projection 101a formed thereon such that when the lever 102 is rotated in the direction of arrow 104 to the forward position (FIGURE 4), the eccentric portion of the cam and the projection 101a will move the lock pad toward the stop bar 99 a sufficient distance to narrow the frame opening so that the lug 98 will engage either the offset 92b or the stop 99 when the connector rod is moved through the frame. When the control lever 102 is rotated to the dotted line position illustrated in FIGURE 9, the connecting rod is freely movable in said frame except as limited by other structure as set forth.

A screw 94 is mounted on the lower outer edge of the support plate so that it will engage the lock pad if said pad is moved a sufficient distance in an outward direction. The lock pad limits the vertical movement of the lock control assembly with respect to the support plate while the screw 94 limits the outward movement of said assembly along the length of support plate slot.

An offset 92b is formed on the lower portion of the retainer member 92 to be spaced from and beneath the stop 99, said offset extending inwardly toward the connector rod. The offset performs a function similar to that performed by the stop. That is, when the piston is in a retracted position and the control lever is turned to the forward position, the lug 98 will engage the under surface of the offset 92b (when the connector rod moves upwardly) to hold the tool 85 in position beneath the bottom bead. When the control lever is turned to the rear position the lug 98 can bypass the offset. After the lug has moved upwardly past the stop and after the control lever is turned to a forward position, the bottom tool will hold the bottom bead above the bottom rim flange.

The structure of the first embodiment of the improved tire changer machine of this invention having been described, the structure of the second embodiment will now be set forth. The second embodiment of the tire changer of this invention, generally designated 125, includes a stand 131, a wheel mounting base 127 secured on the top of said stand, a wheel chuck 128 mounted on said base, said chuck including radial arms 129 which have jaws 132, a center shaft 130 mounted on the wheel mounting base to extend upwardly therefrom and the bead breaker attachment generally designated 126.

The bead breaker attachment 126 is pivotally secured to the central portion of the stand by pivot 144, the pivotal axis of said pivot being located in a plane passed through the longitudinal axis of the central shaft 130 and intermediate of the floor 9 and the wheel mounting base 127. Forming a part of the bead breaker attachment is the support frame 137 the arms of which pass into the interior of the frame through a pair of spaced slots 126a formed in the frame. The arms converge at the outer ends to form structure for mounting the lower end portions of the lever arm 138 and the connector rod 141 therebetween. As may be seen in FIGURE 10, the lower end of the lever arm 138 is pivotally connected to the outer end of the support frame by the lever arm pivot 140 while the lower end of the connector rod 141 is pivotally connected to the frame adjacent to and slightly inward from the lever arm pivot by a connecting arm pivot 139.

Secured to the lower portion of the wheel mounting base to extend outwardly therefrom is a support plate 135 which has an elongated slot 136 formed in the central portion thereof. A brace 169 is secured between the base and the support plate. Secured to the outer end of the support plate is a U-shaped guide bracket 149, said guide bracket having one leg 149a secured on either side of the slot 136 and having the web portion located outwardly a greater distance from the longitudinal axis of the shaft 130 than the pivot 140. The lever arm 138 extends upwardly between the legs of the U-shaped bracket while the connecting rods extend upwardly through the slot 136 formed in the support plate, said bracket and support plate forming structure permitting limited pivotal movement of the lever arm and connector rod respectively. The pivotal axis of the pivots 139 and 140 are substantially perpendicular to the vertical plane passed through the longitudinal axis of the shaft 130. The lever arm 138 extends upwardly from pivot 140 a distance substantially equal to the distance from the pivot 144 to the top of the center shaft 130 and is curved inwardly a slight distance to form the bent end portion 138a.

A bottom bead breaker tool 145 of the same general construction as the bead breaker tool 85 is connected to the upper end of the connecting rod 141. The positioning of the tool 145 is controlled by the positions of the radial arm 129 and the lock control assembly 147 similar to the positioning of the bead breaker tool 85 of the first embodiment. The lock control assembly 147 is constantly urged toward the center shaft 130 by the pair of spaced coil springs 90, each of said springs having one end thereof secured to said base. The construction of the lock control assembly 147 is the same as the construction of the assembly 75 and therefore will not be further described.

A generally U-shaped trapezoidal channel mounting bracket 142 is pivotally connected to the upper end of the lever arm 138 by a pivot pin 143. Secured to a corner portion of the mounting bracket diagonally across from the pivot 143 is a sleeve 166 which slideably mounts the handle 165. The handle 165 includes a hand grip 167 at one end and a screw 168 extending radially from the opposite end, the screw and the hand grip forming structure for retaining the handle in the sleeve 166.

The top bead breaker assembly 155 is attached by a pivot bolt 154 to the corner portion of the mounting member opposite the sleeve for limited pivotal and sliding movement relative to said member. The aforementioned pivot bolt is extended through the elongated slot 158 formed in the upper end portions of a pair of the elongated tool support arms 153 which form a part of said assembly. The longitudinal axis of the slot 158 is parallel to the longitudinal axis of said support arm and the side 159 of said slot is parallel to said longitudinal axis. The opposite side of the slot 160 has a plurality of indentations 161 formed therein.

The tool support arms 153 are bar bent in a U-shape to have a web portion 153a. An aperture 174 is formed in the web for mounting a short bolt 162 for limited movement therein.

Secured to the lower end of the tool support arms is a generally arcuate brace 157 which lies in a plane generally perpendicular to the longitudinal axis of said arms. A diagonal brace 156 is secured to each of the support arms 153 to extend outwardly from the upper end portion thereof to the adjacent end portion of the arcuate brace. Mounted on the arcuate brace is the top bead breaker tool 163, said tool being comprised of an elongated rigid plate which is curved longitudinally and has a radius of curvature slightly greater than the radius of the bead of the largest tire to be removed from its rim. The tool has a lower tire engaging surface 164 which corresponds to the shape of the tire engaging edge 41 of the bead breaker tool of the first embodiment.

A pair of tie bar support plates 171 are secured to the lever arm 138 at the juncture of the bent portion 138a with the straight leg 138b. A tie bar 170 having an elongated slot 173 formed in one end portion thereof is pivotally secured between the pair of tie bar support plates by a pivot 172, said pivot being extended through the slot 173. The tie bar may be pivoted to a non-use position as illustrated in FIGURE 10 and will be maintained in said position since the tie bar moves relative to the pivot 172 to have the top or inner edge of the slot 173 rest thereon, the length of the outer end of the tie bar being sufficiently long to lock the tie bar against the lever arm to prevent rotation of said tie bar when it is in a non-use position.

As may be noted in FIGURE 10, the tie bar is slightly bent to form an obtuse angle and is of the length to extend from the central shaft outwardly to the lever arm 138 when said lever arm is in a vertical position, said tie bar being extended between the tool support arms. A retainer 175 is pivotally secured to the inner end of the tie bar by a pivot member 176. The retainer member includes a sleeve portion 175a having an inner diameter slightly larger than the outer diameter of the central shaft so that it may be fitted thereover. Also formed on the retainer is an offset 175b which overlies the end portion of the central shaft when the sleeve is centered therearound. When the retainer is positioned in the aforementioned manner it extends generally in a vertical direction so that the pivot 176 is adjacent to the central shaft and at a slightly lower elevation than the upper end of said shaft and the pivot 172.

As may be noted in the figures illustrating the first embodiment of this invention, the tire changer machine is provided with a motor 19 for rotating a mounting and demounting tool (not shown) when it is mounted on said shaft. However, it is to be understood that the pneumatically powered bead breaker attachment of this invention is not limited in use to tire changer machines having a power source for rotating either the wheel base or the central shaft. Similarly it is to be understood that even though the second embodiment of this invention is illustrated without a power means for rotating the central shaft, that the manually operated bead breaker attachment of said second embodiment may be used with a tire changer machine having power means for rotating the central shaft or the wheel mounting base. Also it is to be noted that the lever member pivots 78, 140 are spaced from the respective connector arm pivots 38, 139, however it is to be understood that a single pivot may be used for pivoting both the lever member and the connector rod. Also, even though there has been described a specific bracket for holding the cylinder in position and springs for urging the cylinder in a direction toward the lower bead breaker shoe, it is to be understood that other means may be used to perform the same functions.

The structure of the two embodiments of the tire changer machine of this invention having been described, the operation of the first embodiment will now be set forth.

In using this invention it is preferable that the operator preset the wheel chuck for mounting the wheel from which the tire is to be removed so that said wheel will drop in the proper position when it is placed on the wheel base and the wheel chuck is adjusted to firmly hold the wheel in said position. In the event that certain models of wheels are being worked on, such as 14 inch wheels, the side of the wheel that has the greatest width from the drop center to the flange is to be placed down on the base for proper operation of the machine of this invention.

Although usually it is desirable to break both beads with one stroke, in order to facilitate the description of the operation of the first embodiment of this invention it will be assumed that it is only desirable to break the top bead 29. When only the top bead is to be broken, the control lever 102 is rotated to the forward position (FIGURE 4). With the control lever in the forward position, the control rod is prevented from moving relative to the lock control assembly; however, the lock-control assembly and the connector rod may move relative to the support plate in the direction of the double arrow 106 due to the length of the slot 95a and slightly in a vertical direction due to the inclined side 97a formed in the lower edge of the support plates.

After the wheel has been mounted on the tire changer machine and the control lever has been rotated to the forward position, the hand grip 48 is pulled forwardly (and the lever frame 36 therewith) to position the rim flange 29 in the first notch of the control arm. When the control arm is positioned to have the rim flange in the first notch, the bead breaker tool 40 will have the tire engaging edge located just above the bead 29 and spaced radially outwardly a slight distance from the outer radial edge of the rim flange. The top limit stop control 61 is left in the "in position" as shown in full line position in FIGURE 5.

After the controls have been set as described above, the air chuck (not shown) is applied to the nozzle of the handle to actuate the piston 86 and the connector rod connected thereto. Since the bottom bead breaker tool is prevented from moving in an upward direction by the lock control mechanism holding the connector rod at a fixed elevation, the cylinder is forced downwardly and moves the support frame in a downward direction. Since the cylinder is pivotally connected to the support arms 32 through the bracket 77, it is free to rotate in the direction of the arrow 186 with said bracket. At the same time the support arm being pivotally connected to the post 17 by pivot 34, the cylinder in conjunction with the support arms are both free to pivot in a downward direction (arrow 192) which results in the pivot 38 being moved through an arc 186. Since the lever frame 36 is also pivotally connected to the support arms, the lower end of the lever frame is moved through the arc of pivot 38.

At this point it is to be noted that the length of the control arm 46 between the first notch 53 and the pin 51 is substantially equal to the length of the support arm 32 between the pivot 34 and the pivot 38. As a result, as the cylinder forces the lower end of the support frame in a downward direction the upper end of the frame is also moved in a downward direction. However, since the effective length of the control arm is substantially equal to the effective length of the support arms, the pivot 51 is also moved through the same arc as the pivot 38. As a result the upper bead breaker tool 40 (the transverse axis) is moved through a series of parallel planes to bypass the outer vertical edge of the rim flange and to engage the base of the top bead 29. Due to the aforementioned control and support arm pivot connections, as the top bead breaker tool moves downwardly through the aforementioned series of parallel planes, it also moves inwardly closer to the central shaft to thus remain in contact with the base of the bead as it is moved in a downward direction. If the tool 40 did not move in the aforementioned manner, the leading edge would slide off of the bead. Once the bead has been broken, the air chuck is removed from the nozzle and the springs 88 urge the cylinder bracket and the cylinder in an upward direction to the initial top bead breaking position as shown in full lines in FIGURE 2.

The distance between pivots 34 and 51 is in part dependent upon the axial width of the rim. However since the variation in the aforementioned distance is relatively small compared to the total distance and to the effective length of the control arm, the variation in the locations of the pivots and the effective leverage of the machine is relatively small even though the machine is used for breaking beads of tires of different axial widths. Also by providing the stop limit control and the control arm, more straight line movement of the tool 40 is obtained as it is moved in a downward and inward direction. The aforementioned structure provides more positive control of the movement of the pivot points and better leverage during the operation of the tire changer to break the beads from the rim flange than bead breaker attachments of the prior art.

In the event the top bead fails to break (usually because some model of wheels have safety humps 134 on one side of the rim) then the aforementioned settings of the controls are made with the exception that the limit stop control 61 is moved to an out position as illustrated in dotted lines in FIGURE 4. With the wheel position on the tire changer machine with the wide side of the rim down, the aforementioned hump will be on the top side of the rim. Now when the air chuck is applied to the nozzle as previously described, the bead breaker tool 40 is moved further in a downward direction relative to the control arm than with the stop control in an "in position," and also provides better leverage. The increased length of stroke is illustrated by FIGURE 4 wherein the bead breaker tool 40 is shown in full line in its lower most position with the stop control in an "in position" and in dotted line with the bead breaker tool in its lower most position with the stop control in an "out position."

Assuming now that the wheel has been properly locked in position on the wheel base and that it is desired to break both the top and bottom bead 28, 29 in one stroke, the control lever 102 is set in the rear position as illustrated in solid lines FIGURE 3, the stop limit control 61 is set in the "in position," (FIGURE 5) and the bead breaker control 45 is set such that the first notch 53 rests on the top rim flange 26. After the aforementioned control settings have been made, the air chuck is applied to the nozzle 50 to actuate the piston 86 and the cylinder 60. The piston causes the piston rod and the connecting rod 84 to move upwardly in the direction of the arrow 191 to move the lower bead breaker tool into engagement with the base of the bead 28 and thence to break the bottom bead. At the same time as the lower bead breaker tool is moving in an upward direction, the cylinder 60 is forced in a downward direction. The movement of the parts of the bead breaker attachment resulting from the movement of the cylinder are nearly the same as the movement of the parts set forth during the discussion of the operation for breaking only the top bead.

As may be noted, if a line is drawn from the pivot point 34 to the position of the first notch on the rim flange, a second line drawn from said position to the pivot point 51, a third line drawn from pivot 51 to pivot 38, and a fourth line from pivot 38 to pivot 34, a parallelogram is formed. The piston and cylinder combination move nearly along the diagonal of the parallelogram to elongate said parallelogram. Thus as the air is applied to the cylinder, the lower bead breaker plate is moved in an upward direction. At the same time, since the first line between pivot 34 and the rim flange remains stationary and the linkage connections 32 and 46 can rotate relative to frame 36, the pivot 51 is moved through an arc in a downward direction. However, in order for pivot 51 to move, the top bead breaker plate also has to move in the same direction. Thus, if the top bead breaker tool encounters resistance to its movement by engaging the top bead, the forces acting through the aforementioned linkage arms tend to draw the lower bead breaker tool in an upward direction. At the same time, the springs 88 urged the pivot 38 in the opposite direction. The various forces acting through the members forming the parallelogram operate to move the top and bottom bead breaker tools toward one another.

If the bottom bead fails to break, as for example, will happen occasionally with extremely wide wheels or if said bead fails to loosen for other reasons; or if independent operation is desired, the bead breaker control 45 is set so that the rim flange fits in the second notch 54. Setting the control arm so that the rim flange rests in second notch, the pivot 51 is drawn inwardly toward the central shaft and the top bead breaker tool 40 is moved to overhang the rim flange. Thus when air is applied to a nozzle 50, the top bead breaker tool will move in a downward direction to engage the rim flange such as illustrated in FIGURE 3. After the initial movement of the tool 40 to engage the rim flange, the short leg 36a, the control arm 46, and the bead breaker tool 40 substantially form a triangle with pivot 51 being an apex of said triangle. As a result three of the pivots, pivot 51, notch 53, and pivot 34 being fixed, the pivot 38 is not free to move. However, the cylinder is free to pivot in the direction of the arrow 186 and the cylinder rod is free to move in an upward direction (arrow 191) when air is applied to the nozzle 50. Applying air to the air chuck actuates the bottom tool to move upwardly to break the bottom bead 28 from the rim flange.

There may be occasions when a single operation of the bead breaker attachment fails to break the bead all the way around the circumference of the rim. In such an event it is preferable to loosen the wheel chuck and reposition the wheel by turning it approximately one third of a turn. Then the wheel chuck is tightened and air chuck is applied to the nozzle 50 to break the bead from the rim flange.

On some wheels the weight of the tire causes the bottom bead to drop down and stick on the rim flange after it has been broken. In such an event it is desirable to hold the bead above the rim flange so that it does not have to be rebroken from the rim flange. To retain the bottom bead in position above the rim flange, the operator rotates the control 102 to a forward position after the bottom bead has been broken and at the same time as air is being supplied to the nozzle 50. With the control lever in the forward position, the bottom bead breaker tool is maintained at an elevation above the lower rim flange (the lug 98 being retained above the stop 99). Now a tire mounting tool may be secured to the shaft 18 and used in a conventional manner to remove the tire from the rim. Once the tire has been removed, the control lever 102 is rotated in the direction of the arrow 105 to the rear position. Since the lug 98 has an inclined edge 98a and the springs 88 continuously urge the bottom bead breaker plate in the downward direction toward the cylinder the bottom bead breaker tool moves to the "non-use position."

It is to be noted that the inclination of the beed breaker plate also serves to permit it to slide over the end of the arm 16. Also it is to be noted that during the bead breaking operation, the edge portions of the bead breaker tools engaging the beads move in such a way that the transverse axis of each of the tools (if tool moves) moves through a series of planes which are nearly parallel to one another.

The first embodiment of my tire changer machine having been described, the operation of the second embodiment will now be set forth. Assuming that the tire changer machine of the second embodiment is in a non-use position as illustrated in FIGURE 10, a wheel 24 is placed on the wheel mounting base 127 after the wheel chuck 128 has been preset. After the wheel has been placed on the base, the wheel chuck is tightened to firmly hold the rim 25 in position.

For the purposes of facilitating the description of the operation of the second embodiment, it will now be assumed that it is desired to break only the top bead. For breaking the top bead the control lever 148 is rotated in the direction of an arrow 182 to the forward position (as illustrated in FIGURE 11) to prevent the connecting rod 141 and the lower bead breaker tool from being raised during the operation of the bead breaker attachment. Now the top bead breaker tool is raised to space the lower edge 164a radially outwardly from the edge of the rim flange 146 and on the top bead 150 (see FIGURE 15). While the top bead breaker tool is being held in position above the tire, the tie bar 170 is first moved upwardly in a vertical direction so that the pivot 172 is in the lower edge of the slot 173 and then is pivoted so that the sleeve 175a of the retainer 175 is set on the top portion of the shaft 130. The upper end of the tool support arm is adjusted to position the support arm pivot 154 in the desired indentation 161 (normally the top indentation being used for very narrow rims and the bottom indentation for very wide rims). Now the handle is slid upwardly in the sleeve 166 (FIGURE 11) and downward pressure is applied on the grip 167 of the handle. Since the connector rod 141 cannot move in either an upward or downward direction the pivot point 139 and likewise pivot 140 remains in a fixed position. Also since the pivot 140 remains in a fixed position, the lower end of the lever arm 138 is fixed while the upper end is held in position by the retainer or tie bar 170. As a result of the aforementioned linkages and pivots, pressing downwardly on the handle 165 forces the top bead breaker assembly 155 in a downward direction, the mounting bracket pivot 143 forming a fixed fulcrum.

When it is desired to break only the bottom bead, the wheel is positioned on the tire changer machine as previously described. However, for breaking the bottom bead, the control lever 148 is moved to the rear position (as shown in solid lines FIGURE 12) to permit the connector rod to be moved relative to the lock control mechanism 147. Now the top bead breaker assembly 155 is pulled inwardly toward the center shaft 130 to position the web portion 153a of the support arm on the rim flange 146 so that the rim flange engages said web intermediate the stop pin 162 and the top bead breaker tool for retaining the assembly in position on the rim flange. As may be noted the stop pin 162 is retained within the aperture 174 for limited movement therein.

After the top bead breaker assembly is properly positioned on the rim flange, the tie bar is attached to the center shaft in the manner described for breaking the top bead. Then the handle is rotated in the direction of the arrow 184 after the support arm pivot has been set in the proper indentation 161. As may be observed from FIGURE 12, when the handle 165 is rotated in the direction of the arrow 182, it pivots about the support arm pivot 154 to move the pivot 143 through an arc in a generally upward direction. At the same time the tie bar 170 pivots the pivot pin 176 to move the pivot 172 in an arc about the pivot 176. The aforementioned movement of pivots, the support arm and tie bar linkage connections caused depressing the handle result in the upper end of the tool support arms being pivoted about the rim flange (arrow 185) to move the mounting bracket pin 143 in a vertical direction. The movement of the mounting bracket pin draws the lever arm in an upward direction to have the lower end thereof and the support frame pivot about the stand pivot 144. As may be noted, the support frame is rotated through the near horizontal portion of an arc and thus the movement of pin 140 is substantially vertical relative to the amount of horizontal movement. This movement is transmitted through the connecting bar to the bottom tool which in turn breaks the bottom bead 150 from the bottom rim flange 146. By providing the elongated slot 136 in the support plate, the connecting rod can move in an outward direction. However, the amount of movement in said direction is limited by the coil spring 90 and the stop screw (not shown) secured to the outer end of the support plate.

After the beads are broken, the retainer is detached from the central shaft. The tie bar is pivoted about the pivot bolt 172 and lowered so that the slotted end thereof will lock the tie bar in a vertical position. Then the bead breaker handle is rotated so that it will slide in the sleeve and hang down behind the machine (as shown in FIGURE 10).

If the bottom bead drops and sticks after it has been broken, the control lever 148 may be rotated in the direction of the arrow 182 to the forward position while the bottom bead breaker tool 145 is in the raised position (see FIGURE 13). This will hold the bottom bead breaker tool up and prevent the tire from dropping down. After the tire has been demounted, the control lever 148 is rotated in the direction of the arrow 183 to the rear position to permit the attachment to resume the non-use position.

As many widely apparent different embodiments of this invention may be made without departing from the spirit and scope thereof, it is to be understood that I do not limit myself to the specific embodiments herein.

What I claim is:

1. A bead breaker attachment to be mounted on a tire changer machine for breaking the beads of a tire from the rim flanges of a rim comprising an elongated support member pivotally connected at its one end to the tire changer, a lever member of a substantial longer length than the support member pivotally connected to the other end of said support member, a bottom bead breaker tool having an elongated arm, means for connecting said arm to the support member to pivot about an axis within close proximity of the pivotal connection between the support member and the lever member, means attached to the tire changer for limiting the pivotal movement of the bottom bead breaker tool, a top bead breaker tool connected to the upper end of the lever member, means to cause movement of the bottom and top breaker tools relative to one another, elongated means pivotally connected to the upper end of the lever member in spaced relation to the top bead breaker tool for controlling the movement of the lever member relative to a rim flange as the bottom and top bead breaker tools move relative to one another to break a bead from the rim flange of a tire changer, said control member, lever member, lower bead breaker arm and support member each having a pivotal axis that is perpendicular to a common plane whereby the top and bottom bead breaker tools may be moved in opposite directions toward one another.

2. A tire changer machine for holding a wheel having a tire and rim and breaking the bead of a tire from the rim flange of a rim comprising an upright stand, a wheel mounting base mounted on the top of said stand, a wheel chuck mounted on said base, a support member pivotally connected to the lower portion of said stand to extend outwardly therefrom, an elongated lever member pivotally connected to the outer end of the support member, elongated means for controlling the location of the upper end of the lever member relative to a rim mounted on said base, said control means having one end pivotally connected to the upper end of said lever member, a bead breaker tool having an arm mounted to pivot within close proximity of the pivotal connection of the lever member to the support member and a bead engaging member adjacent said base, means for limiting the pivotal movement of said tool outwardly from the wheel mounting base, said limit means including a support plate fixedly secured to the wheel mounting base and a lock control assembly connected to the tool arm and mounted for limited movement on the support plate, and means for moving said tool to break the bead from the rim flange.

3. The machine of claim 2 further characterized in that the lock control assembly includes a frame having an opening for the bead breaker arm to move therethrough, first means mounted on said arm for limiting the downward movement of said arm in the frame, second means mounted on said arm at a lower elevation than said first means for selectively holding said arm at a fixed elevation in a non bead breaking position and holding said arm in a bead broken position and freely mounting said arm for limited slideable movement through the frame and a control means for selectively determining the spacing of said second means relative to said frame.

4. The machine of claim 3 further characterized in that the elongated means includes a control arm having means for pivotally connecting the end of said arm opposite the frame member to a rim flange.

5. A tire changer machine for mounting a wheel having a rim and a tire for breaking the bead of a tire from the rim flange of a rim comprising an elongated stand, a wheel mounting base secured to one end of said stand, a wheel chuck mounted on said base for securing a wheel in position to have the beads broken, a support member having one end pivotally connected to the opposite end of said stand to have a pivotal axis perpendicular to the longitudinal axis of said stand, a lever member having one end pivotally connected to the opposite end of said support member to have a pivotal axis generally parallel to the pivotal connection of the support member to the stand, a first bead breaker tool connected to the opposite end of said lever member, elongated means for controlling the movement of the opposite end portion of the lever member while the bead is being broken from the rim flange, said elongated means being pivotally connected at one end to said opposite end portion of the elongated member to selectively overhang the tire and having spaced means for selectively positioning the first tool to a bead breaking position and a non-bead breaking position, and means for controlling the movement of the lever member to move the bead breaker tool to break the bead from the rim flange, said bead breaker tool in a bead breaking position being on the opposite side of the tire positioned on said base from the support arm, said means for controlling the movement of the lever member including a second bead breaker tool for breaking the opposite bead from the first bead breaker tool, lock means for controlling the movement of said tools and pneumatic means for selectively moving the second bead breaker tool and the lever member to move the first bead breaker tool to break their adjacent beads.

6. The machine of claim 4 further characterized in that the first bead breaking tool is an elongated longitudinally curved plate having a transverse slot therein, that the control arm pivots in said slot and that control means is mounted to selectively limit the pivotal movement of said lever in the slot, said control means including a plunger member.

7. The machine of claim 4 further characterized in that the pneumatic means includes piston-cylinder combination pivotally connected to the support member, said second tool being connected to the piston, means for urging the cylinder toward the second tool, and means for limiting the movement of the lever member away from the stand.

8. A tire changer machine for holding a wheel having a tire and a rim and for breaking the bead of the tire from the rim flange comprising an elongated upright stand, a wheel mounting base mounted on the top portion of said stand, a wheel chuck mounted on said base for holding a wheel on said base, an upright control shaft mounted on said base, and bead breaker attachment means pivotally mounted on the lower portion of the stand for selectively breaking the top bead and the bottom bead from their respective rim flanges without removing the wheel from the mounting base, said bead breaker attachment means including a top bead breaker tool, a bottom bead breaker tool, a member attached to the bottom bead breaker tool to mount it for movement between a lower position and a raised bead breaking position, operating means to cause movement of said member and top bead breaker shoes relative one another, and lock control means for alternately selectively retaining said member and the bottom bead breaker tool in a raised bottom bead breaking position and at the same time permitting the top bead breaker tool being moved to break the top bead away from the rim flange as the operating means is operated, and permitting both bead breaker tools operating simultaneously to break both the top and bottom beads from the respective rim flanges.

9. A tire changing machine for mounting a wheel having a rim and a tire for breaking the bead of a tire from the rim flange of a rim comprising a stand, a wheel mounting base mounted on the upper end of said stand, a wheel chuck mounted on said base for securing a wheel in position to have the beads broken away from the rim flanges, a support member pivotally connected at one end to said stand, and means pivotally mounted on the opposite end of said support member for breaking a bead from a rim flange, said means including an upwardly extending lever pivotally connected at one end to the opposite end of the support member and of a length to have an opposite upper end located at an elevation higher than said base, a bead breaker tool connected to the upper end of said lever for breaking a bead from a rim flange, means connected to said lever for moving said lever to move the tool to break a bead, and means pivotally connected to the upper end of the lever for controlling the path of motion of the upper end of the lever relative to the tire as the lever is moved to move the tool to break a bead, each of the pivot connections located to have a pivot axis parallel to the pivot axes of the other pivot connections.

10. A tire changing machine for mounting a wheel having a rim and a tire for breaking the bead of a tire from the rim flange of a rim comprising a stand, a wheel mounting base mounted on the upper end of said stand, a wheel chuck mounted on said base for securing a wheel in position to have the beads broken away from the rim flanges, a support member pivotally connected at one end to said stand, and means pivotally mounted on the opposite end of the support member for breaking a bead from a rim flange, said bead breaking means including a bead breaker tool and means connected to said tool for moving the tool between a bead breaking position and a non-bead breaking position, said last mentioned means including an upwardly extending lever pivotally connected at the lower end to the support member and elongated control means pivotally connected at one end to the upper end of the lever for retaining the upper end of the lever in a prescribed path of motion relative to a rim of a given size as the means connected to the tool is operated to move the bead breaker tool between said bead breaking position and a non-bead breaking position, the pivot connections having parallel pivot axes.

11. The machine of claim 10 further characterized in that a second bead breaker tool is connected to the upper end of said lever for breaking the bead remote from the first mentioned bead breaker tool and that there is provided means for retaining the second tool in engagement with the top rim flange and leaving the top bead intact on the top rim flange while the means connected to the first tool moves said first tool to break the adjacent bead.

12. A tire-changing machine for mounting a wheel having a rim and a tire for breaking the bead of a tire from the rim flange of a rim comprising a stand, a wheel mounting base mounted on the upper end of said stand, an upright shaft mounted on the wheel base, a wheel chuck mounted on said base for securing a wheel in position to have the beads broken away from the rim flanges, a support member pivotally connected at one end to said stand, and means pivotally mounted on the opposite end of said support member for breaking a bead from the rim flange, the aforementioned means including an upwardly extending lever pivotally connected at one end to the opposite end of the support member, a first bead breaker tool connected to the upper end of said lever for breaking a bead from a rim flange, means connected to said lever for moving said lever to move the tool to break a bead, and means pivotally connected to the upper end of the lever for controlling the path of motion of the upper end of the lever as the lever is moved to move the tool to break a bead, each of the aforementioned pivotal connections located to have a pivot axis parallel to the pivot axes of the other pivotal connections, said control means including a tie bar pivotally connected at one end to the lever, and means pivotally mounted on the opposite end of the tie bar for removably connecting the tie bar to the upright shaft.

13. A tire-changing machine for mounting a wheel having a rim and a tire for breaking the beads of a tire from the rim flange of a rim comprising a stand, a wheel mounting base mounted on the upper end of said stand, a wheel chuck mounted on said base for securing the wheel in position to have the beads broken away from the rim flanges, a support member pivotally connected at one end to said stand, and means pivotally mounted on the opposite end of said support member for breaking a bead from a rim flange, the aforementioned means including an upwardly extending lever pivotally connected at one end to the opposite end of the support member, a first bead breaker tool connected to the upper end of said lever for breaking a bead from a rim flange, means connected to said lever for moving said lever to move the tool to break a bead and means pivotally connected to the upper end of the lever for controlling the path of motion of the upper end of the lever as the lever is moved to move the tool to break a bead, each of the aforementioned pivotal connections located to have a pivot axis parallel to the axes of the other pivotal connections, said control means including a control arm pivotally connected at one end to the lever and at the other end having spaced notched out portions for pivotally connecting the opposite end to a rim flange.

14. A tire-changing machine for mounting a wheel having a rim and a tire for breaking the bead of a tire from the rim flange of a rim comprising a stand, a wheel mounting base mounted on the upper end of said stand, a wheel chuck mounted on said base for securing a wheel in position to have the beads broken away from the rim flanges, a support member pivotally connected at one end to said stand, and means pivotally mounted on the opposite end of said support member for breaking a bead from a rim flange, the aforementioned means including an upwardly extending lever pivotally connected at one end to the opposite end of the support member, a first bead breaker tool connected to the upper end of said lever for breaking a bead from a rim flange, means connected to said lever for moving said lever to move the tool to break a bead, and means pivotally connected to the upper end of the lever for controlling the path of motion of the upper end of the lever as the lever is moved to move the tool to break a bead, each of the aforementioned pivotal connections being located to have a pivotal axis parallel to the pivot axes of the other pivotal connections, said lever having an inwardly curved upper end portion above the pivotal connection of the control means to the lever, and means mounted on said curved end portion of the lever for selectively limiting the movement of the lever and the bead breaker tool in breaking the top bead.

15. A tire-changing machine for mounting a wheel having a rim and a tire for breaking a bead of a tire from the rim flange of a rim comprising a stand, a wheel mounting base mounted on the upper end of said stand, a wheel chuck mounted on said base for securing the wheel in position to have the beads broken away from the rim flanges, a support member pivotally connected at one end to said stand, and means pivotally mounted on the opposite end of the support member for breaking a bead from the rim flange, said bead breaking means including a first bead breaking tool, means connected to said tool for moving the first tool between a bead breaking position and a non-bead breaking position, said last mentioned means including an upwardly extending lever pivotally connected at the lower end to the support member, a piston cylinder combination pivotally connected to the support member adjacent the lever, said piston cylinder combination having a piston rod connected to the first tool, and elongated control means pivotally connected at one end to the upper end of the lever for retaining the upper end of the lever in a prescribed path of motion relative to a rim of a given size as the means connected to the tool is operated to move the bead breaker tool between said bead breaking positions and a non-bead breaking position, the pivotal connections having parallel pivot axes, and a second bead breaker tool connected to the upper end of said lever for breaking the bead opposite to that engaged by the first bead breaking tool.

16. A bead breaker attachment to be mounted on a tire changer machine for breaking the beads of a tire from the rim flanges of a rim comprising an elongated support member to be pivotally connected at one end to the tire changer, a lever member of a substantially longer length than the support member pivotally connected to the other end of said support member, a bottom bead breaker tool having an elongated arm, means for connecting said arm to the support member to pivot about an axis within close proximity of the pivotal connection between the support member and the lever member, means attached to the tire changer for limiting the pivotal movement of the bottom bead breaker tool, a top bead breaker tool connected to the upper end of the lever member, means to cause movement of the bottom and top bead breaker tools relative to one another, elongated means pivotally connected to the upper end of the lever member in spaced relation to the top bead breaker tool for controlling the movement of the lever member relative to a rim flange as the bottom and top bead breaker tools move relative to one another to break a bead from a rim flange of a tire mounted on the tire changer, said control means, lever member, lower bead breaker arm and support arm pivotal connections having pivotal axes that are perpendicular to a common plane whereby the top and bottom bead breaker tools may be moved in opposite directions towards one another, said means attached to the tire changer including a support plate having an elongated slot therein and a lock control slidably retained in the slot for selectively alternately holding the lower bead breaker arm for moving through said slot and permitting the arm to move through said slot.

References Cited in the file of this patent
UNITED STATES PATENTS

| | | |
|---|---|---|
| 1,066,210 | Mahon | July 1, 1913 |
| 1,650,674 | Weaver | Nov. 29, 1927 |
| 2,413,010 | Teegarden | Dec. 24, 1946 |
| 2,609,038 | Henderson | Sept. 2, 1952 |
| 2,695,659 | Athmann | Nov. 30, 1954 |
| 2,760,563 | Bishman | Aug. 28, 1956 |
| 2,818,108 | Wells | Dec. 31, 1957 |
| 2,825,395 | Twiford | Mar. 4, 1958 |
| 2,840,143 | Skiles | June 24, 1958 |
| 2,842,191 | Coats | July 8, 1958 |